United States Patent
Dang et al.

(10) Patent No.: US 6,718,352 B1
(45) Date of Patent: Apr. 6, 2004

(54) METHODS AND APPARATUS FOR MANAGING A DATA SET STORED ON A DATA STORAGE DEVICE

(75) Inventors: Thai Q. Dang, Westford, MA (US); Muralidhar R. Balcha, Milford, MA (US)

(73) Assignee: EMC Corporation, Hopkinton, MA (US)

(*) Notice: Subject to any disclaimer, the term of this patent is extended or adjusted under 35 U.S.C. 154(b) by 302 days.

(21) Appl. No.: 09/812,911

(22) Filed: Mar. 20, 2001

(51) Int. Cl.[7] ............................................... G06F 17/30
(52) U.S. Cl. ........................... 707/205; 711/209; 714/6
(58) Field of Search .................... 707/205; 711/209; 714/6

(56) References Cited

U.S. PATENT DOCUMENTS

| | | | | |
|---|---|---|---|---|
| 5,226,143 A | * | 7/1993 | Baird et al. ................... | 711/145 |
| 5,504,861 A | * | 4/1996 | Crockett et al. ............... | 714/13 |
| 5,682,513 A | * | 10/1997 | Candelaria et al. ........... | 711/113 |
| 5,692,155 A | * | 11/1997 | Iskiyan et al. ................ | 711/162 |
| 5,720,029 A | * | 2/1998 | Kern et al. .................... | 714/20 |
| 5,734,818 A | * | 3/1998 | Kern et al. .................... | 714/20 |
| 5,742,792 A | * | 4/1998 | Yanai et al. ................... | 711/162 |
| 5,781,732 A | * | 7/1998 | Adams .......................... | 709/205 |
| 5,901,327 A | * | 5/1999 | Ofek ............................ | 710/5 |
| 6,052,758 A | * | 4/2000 | Crockett et al. ............... | 711/113 |
| 6,304,980 B1 | * | 10/2001 | Beardsley et al. ............. | 714/6 |
| 6,591,351 B1 | * | 7/2003 | Urabe et al. .................. | 711/162 |

* cited by examiner

*Primary Examiner*—Wayne Amsbury
(74) *Attorney, Agent, or Firm*—Chapin & Huang, L.L.C.; David E. Huang, Esq.

(57) ABSTRACT

The invention is directed to techniques for managing a data set stored on a host computer that is in communication with a data storage assembly. A data manager on a host computer copies the data set to a synchronous copy of the data set stored on the data storage assembly and establishes a synchronous relationship between the data set and the synchronous copy. The data manager of the host computer can split the synchronous copy from the data set and generate a duplicate copy of the synchronous copy. Then the data manager can reestablish the synchronous relationship between the data set stored on the host computer and the synchronous copy stored on the data storage assembly.

24 Claims, 5 Drawing Sheets

METHODS AND APPARATUS FOR MANAGING A DATA SET STORED ON A DATA STORAGE DEVICE

BACKGROUND OF THE INVENTION

In one conventional approach to mirroring, a computer system writes data to a first disk and copies the data to a second disk. For example, the computer system can write data to a local disk and subsequently write data to a disk of an external data storage system. In particular, when the computer system makes a change to the original data stored on the local disk of the computer system, such as by a change data command to write new data to the local disk, the computer system sends the change data command to the external data storage system to update the mirror copy of the data. Thus, the computer system maintains the data on the mirror copy as a mirror or exact duplicate of the original data stored on the local disk of the computer system. The mirror copy provides a fault tolerant copy of the original data. If there is a failure of the original local disk and loss of the original data, the computer system disk can use the mirror disk on the external data storage system as a replacement of the original disk.

In another conventional approach to mirroring data (i.e., mirroring on the same data storage system), a host computer system stores data (i.e., original or master version of the data) on an external data storage system connected to the host computer system (e.g., connected by a channel connection), such as on a disk on the data storage system. The data storage system includes processing circuitry that creates a mirror copy of the data within the same data storage system, for example, by copying the original data from one disk to a mirror copy on another (e.g., mirror) disk in the same data storage system. As the processing circuitry of the data storage system changes data on the original version of the data, the processing circuitry makes the same changes to the data on the mirror copy. If there is a failure of the original disk, the host computer system can still access the other disk having the mirror copy of the data by communicating with the processing circuitry.

In addition, in the approach of mirroring on the same data storage system, the data storage system can then stop or quiesce the process of updating the mirror copy, thus performing a split of the mirror copy from the original version of the data. The data storage system can then make a further additional copy of the mirror copy. After making this additional copy, the data storage system can end the split by updating the mirror copy with any changes made to the original version of the data while the split was in effect so that the mirror copy becomes an up-to-date mirror of the original data. The additional copy of data made during the split can serve as an additional mirror copy available for restoration operations, or be made available for other purposes.

SUMMARY OF THE INVENTION

The conventional approaches described above have a number of deficiencies when mirroring data. In the approach of mirroring from a local disk to an external data storage system, the host computer performs the mirroring for the purpose of fault tolerance, so that the host computer can access the mirror copy if the local disk fails. In such a case, if the host computer wishes to have the data available on a local disk (e.g., if the failed disk is replaced with a new disk), the host computer must typically perform a lengthy process of copying all of the data from the mirror copy on the external data storage system to the local disk. In addition, this approach is not adapted to enable the host computer to perform other kinds of operations on the mirror copy, such as making an additional copy of the mirror copy.

In the conventional approach of mirroring on the same data storage system, both the original version of the data and the mirror copy reside on the same data storage system. If a failure of the data storage system occurs, or of the connection between the host computer and the data storage system, then the host computer loses access to both copies of the data. In addition, the host computer views only the original version of the data on the data storage system and does not have a direct access to the mirror copy of the data, unless the original disk fails and the processing circuitry of the data storage system provides the host computer with access to the mirror copy in place of the original version. Generally, the host computer cannot directly invoke operations, such as splitting and making additional copies, on the mirror copy of the data. For example, the host computer cannot mirror a local disk to a mirror copy in an external data storage system and then split the local disk from the mirror copy. Such operations must be initiated and performed by the processing circuitry of the data storage system on an original version of data and mirror copy both stored on the data storage system.

In contrast, in the approach of the invention, the host computer can direct operations on a remote mirror or synchronous copy of a data set, such as generating a duplicate copy, while retaining the original version of the data set resident on the host computer (or a data storage device closely coupled to the host computer). The host computer can direct that the synchronous copy that resides on a data storage assembly be split from the original version, and a duplicate copy be made from the mirror (e.g., synchronous copy). Thus, the host computer can make a duplicate copy available for its own use, as an additional mirror, for backup purposes, or for other purposes, such as analysis of the data in the duplicate copy by another host computer. In the case of a disk, power, or other failure, the host computer has the advantage of accessing the data in its original version, in the mirror copy, or in an additional copy previously made during a split operation depending on which version or copy is available.

In one embodiment, the invention is directed to a host computer for generating a duplicate copy of a data set on a data storage assembly in communication with the host computer. The host computer includes a memory that stores a data manager application, a storage device that stores a data set, an input/output controller in communication with the memory and the storage device, and a processor in communication with the memory, the storage device, and the input/output controller. The processor, when operating in accordance with the data manager application, forms a data manager, which establishes a synchronous relationship between the data set and a synchronous copy of the data set splits the data set from the synchronous copy of the data set to terminate the synchronous relationship between the data set and the synchronous copy of the data set, and copies the synchronous copy of the data set to generate the duplicate copy of the data set. The synchronous copy is stored on the data storage assembly. Thus the data manager can control, from the host computer, a split of the data set and the synchronous copy, and the generation of the duplicate copy of data set from the synchronous copy.

In another embodiment, the data manager application further configures the processor to re-establish the synchronous relationship between the data set and the synchronous copy of the data set, after copying the synchronous copy of the data set. The data manager can re-establish the synchronous relationship to update the data in the data set to match the data in the synchronous copy.

In another embodiment, the data manager application further configures the processor to set up a track table on the data storage assembly that provides status entries for tracks for the synchronous copy of the data set. The data manager can use the data storage assembly track table to determine which tracks for the synchronous copy have changed data, for example, if the data set is unavailable and the data manager is using the synchronous copy as the master version of the data set. Thus, during an incremental restoration of the data set the data manager can use the data storage assembly track table to determine which tracks of the synchronous copy must be copied to the data set to restore the data set so that the data in the data set matches the data in the synchronous copy.

In a further embodiment, the data manager application further configures the processor to set each status entry in the data storage assembly track table to an invalid status, and, while copying data from the data set to each respective track of the synchronous copy of the data set, to set each status entry for each respective track in the data storage assembly track table to a valid status. Thus, during an establishment operation when first establishing the synchronous copy, the data manager can use the data storage assembly track table to determine which tracks on the synchronous copy have been copied from the data set and, if an interruption occurs, which tracks on the synchronous copy still need to be copied from the data set.

In another embodiment, the data manager application further configures the processor to access, in response to an unavailability of the data set, a specific track in the synchronous copy of the data set to change data in the specific track and setting a respective status entry for the specific track in the data storage assembly track table to indicate a change status for the specific track. Thus, if the data set is unavailable due to a mechanical or other problem, the data manager can use the synchronous copy as the master version of the data set, while using the track table on the data storage assembly to indicate which tracks on the synchronous copy have changed after the data set becoming unavailable.

In another embodiment, the data manager application further configures the processor to set up a host track table on the host computer that provides status entries for tracks for the data set. Thus the data manager can set up a track table on the host computer for the data set to list changes in data in the data set.

In an additional embodiment, the data manager application further configures the processor to copy changed tracks identified by the status entries in the host track table from the data set to the synchronous copy of the data set to re-establish the synchronous relationship between the data set and the synchronous copy of the data set. Thus the data manager can use the track table on the host computer to determine which tracks have changed data and must be copied to the synchronous copy to insure that the data in the synchronous copy is the same as the data in the data set.

In another embodiment, the data manager application further configures the processor to update the data set based on pending changes to the data set and to quiesce the data set. Thus, in anticipation of an establishment or split operation, the data manager can update the data set and cease to make any additional changes for a period of time (e.g., while a duplicate copy is made).

In a further embodiment, the data manager application further configures the processor to apply the pending changes maintained in an application queue to the data set. Thus, the data manager may access an application (e.g., airline reservations application) performing on the host computer to flush any pending data changes from the queue and apply them to the data set in anticipation of an establishment or split operation requiring that changes to the data set be suspended for a period of time.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

The techniques of the invention may be employed in computer systems, data storage systems and components of such systems, as well as other computer-related systems and devices, such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for directing operations on a remote mirror or synchronous copy of a data set, such as generating a duplicate copy, while retaining the original version of the data set resident on the host computer. The host computer can direct that the synchronous copy that resides on a data storage assembly be split from the original version, and a duplicate copy be made from the mirror (e.g., synchronous copy). Thus, the host computer can make a duplicate copy available for its own use, as an additional mirror, for backup purposes, or for other purposes, such as analysis of the data in the duplicate copy by another host computer. In the case of a disk, power, or other failure, the host computer has the advantage of accessing the data in its original version, in the mirror copy, or in an additional copy previously made during a split operation.

Figure 1:
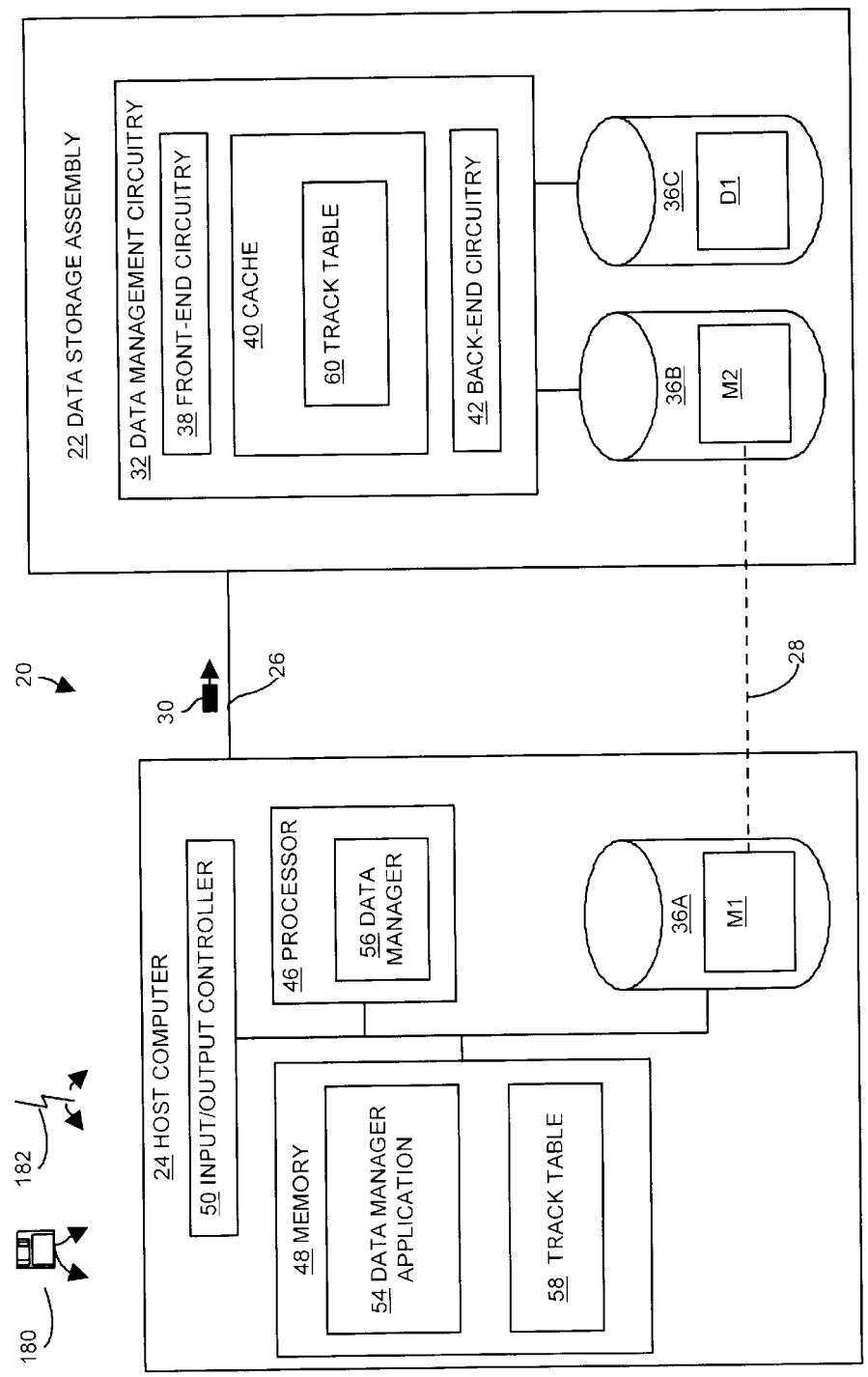
FIG. 1 shows a block diagram of a host computer connected to a data storage assembly in a configuration suitable for use with the invention.

FIG. 1 shows a block diagram of a distributed computing system 20 suitable for use by the invention. The distributed computing system 20 includes a data storage assembly 22, host computer 24, and communication connection 26 that provides communication between the data storage assembly 22 and the host computer 24. The distributed computing system 20 also includes data storage devices 36 (e.g., 36A that is associated with the host computer, and 36B and 36C that are part of the storage assembly 22), as will be described in more detail later. The communication connection 26 provides connectors. (e.g., cables) suitable for connecting computers and/or electronic devices, such as one based on channel connections supporting the SCSI (Small Computer System Interface) commands and protocols. FIG. 1 also illustrates a data change signal 30 sent by the host computer 24 to the data storage assembly 22 (e.g., synchronization signal that updates to data on a mirror copy M2 on the data storage assembly 22 as the result of a change to data on the original or standard version M1 of the data on the host computer 24).

The data storage assembly 22 includes data management circuitry 32 and data storage devices 36B and 36C. The data management circuitry 32 provides an interface between the communication connection 26 and the data storage devices 36. The data management circuitry 32 includes front-end circuitry 38, cache memory 40, and back-end circuitry 42. The cache memory 40 acts as a buffer for data received from the host computer 24. The front-end circuitry 38 operates to provide an interface between the communication connection 26 and the cache memory 40. The back-end circuitry 42 operates to provide an interface between the cache memory 40 and the data storage devices 36B and 36C. The data storage devices 36 (e.g., 36B and 36C associated with the data storage assembly 22 and 36A associated with the host computer 24) are data storage components suitable for storing data used with computer systems and other electronic devices, including, for example, hard disk drives, tape drives, writeable CD-ROM drives, and/or other data storage components. The cache memory 40 includes a track table 60 that is a table of tracks on the data storage devices 36B and 36C (e.g., tracks on one or more disks) that records whether the data in each track is invalid or recently changed, as will be discussed in more detail for FIGS. 3A through 5B.

The host computer 24 is a computer system or other electronic device capable of processing and storing data. The host computer 24 includes a data storage device 36A (e.g., nonvolatile storage such as a disk), processor 46 (e.g., microprocessor), memory 48 (e.g., volatile memory and nonvolatile data storage), and input/output controller 50, which are all in communication with each other through communication circuitry (e.g., a bus) internal to the host computer 24. The memory 48 includes a data manager application 54 (e.g., logic instructions stored on a hard disk). It is to be understood that when a reference is made to the data manager 56 performing an action, this means that the processor 46 of the host computer 24 operating according to the instructions of the data manager application 54 is performing the action. The memory 48 also includes a track table 58, which is a table of tracks on the data storage device 36A (e.g., tracks on a disk) that records whether the data in each track is invalid or recently changed, as will be discussed in more detail later for FIGS. 3A through 5B.

The host computer 24 includes a data storage device 36A (as described previously), which includes a data set M1 (e.g., original data or standard or STD volume) is actively accessed by a database or other application performing on the processor 46 of the host computer 24. For example, the data set M1 is on active production volume accessed by an airline reservations application performing on the processor 46 of the host computer 24. The data storage device 36B of the data storage assembly 22 includes a synchronous copy of the data set M2 that is a mirror copy of the standard data set M1. That is, the host computer 24 establishes the copy by making a copy of the data set M1 to the synchronous copy M2 stored on the data storage assembly. The data storage device 36C of the data storage assembly 22 includes a duplicate data set D1 that is a duplicate of the synchronous copy M2, as described in more detail later. The data set (e.g., M1, M2, or D1) can be based on a file, file set, logical volume, file system, disk tracks, disk sectors, disk blocks, disk extents, or other groupings of data stored on one or more data storage devices 36.

FIG. 1 also illustrates a synchronous relationship 28 between the data set M1 and the synchronous copy M2. The synchronous relationship 28 is a logical or virtual relationship based on data change signals 30 that maintains the synchronous copy M2 as a current copy of the data set M1, as described below. The synchronous relationship 28 does not represent any direct physical connection between the data set M1 and the synchronous copy M2 or direct physical connection between the data storage device 36A and data storage device 36B. There is an indirect physical connection between the data set M1 and the synchronous copy M2. For example, there is an indirect connection from the data set M1 through the data storage device 36A, the processor 46 and the input/output controller 50 to the communication connection 26, then through the communication connection 26 to the data storage assembly 22, and then through the data management circuitry 32 to the data storage device 36B to the synchronous copy M2.

Data set D1 (e.g., BCV or business continuance volume) is a duplicate copy of the synchronous copy M2 that can be used for concurrent tasks (e.g., concurrent copying of the data set D1 to an additional backup volume or concurrent reading of the data set D1 by a computer other than the host computer 24) without interfering with or degrading the ongoing mirroring of data set M1 by the synchronous copy M2. Thus another computer can access data set D1 for tasks such as testing or analysis of the data in parallel with ongoing production tasks (e.g., ongoing data access by the host computer 24) performed for data set M1 and mirrored in the synchronous copy M2.

In one embodiment, a computer program product 180 including a computer readable medium (e.g., one or more CDROM's, diskettes, tapes, etc.) or a computer program propagated signal product 182 embodied on a propagated signal on a propagation medium (e.g., a radio wave, an infrared wave, a laser wave, sound wave, or an electrical wave propagated over the Internet or other network) provides software instructions for the data manager application 54.

In a general summary of the operations of FIG. 1, the host computer 24 establishes a mirror copy of the data set M1 (e.g., original or standard data set) by copying the data set M1 from the data storage device 36A over the communication connection 26 to the 20 data storage assembly 22 to be stored as the synchronous copy of the data set M2 on data storage device 36B. The host computer 24 also establishes a synchronous relationship 28 between the data set M1 and the synchronous copy of the data set M2 by transmitting a data change signal 30 whenever the host computer 24 accesses (e.g., changes) the data on the data set M1. The data storage assembly 22 receives the data change signal 30 over the communication connection 26 and updates the synchronous copy M2 based on the data change signal 30. The host computer 24 can quiesce the data set M1 (i.e., cease to make changes to the data) and perform a split operation by splitting the data set M1 from the synchronous copy M2 by terminating the synchronous relationship 28. After the split operation, the host computer 24 can direct the data storage assembly 22 to copy the synchronous copy M2 to a duplicate copy D1 stored on data storage device 36C of the data storage assembly 22. The host computer 24 can then re-establish the synchronous relationship 28 between the data set M1 and the synchronous copy M2.

Figure 2:
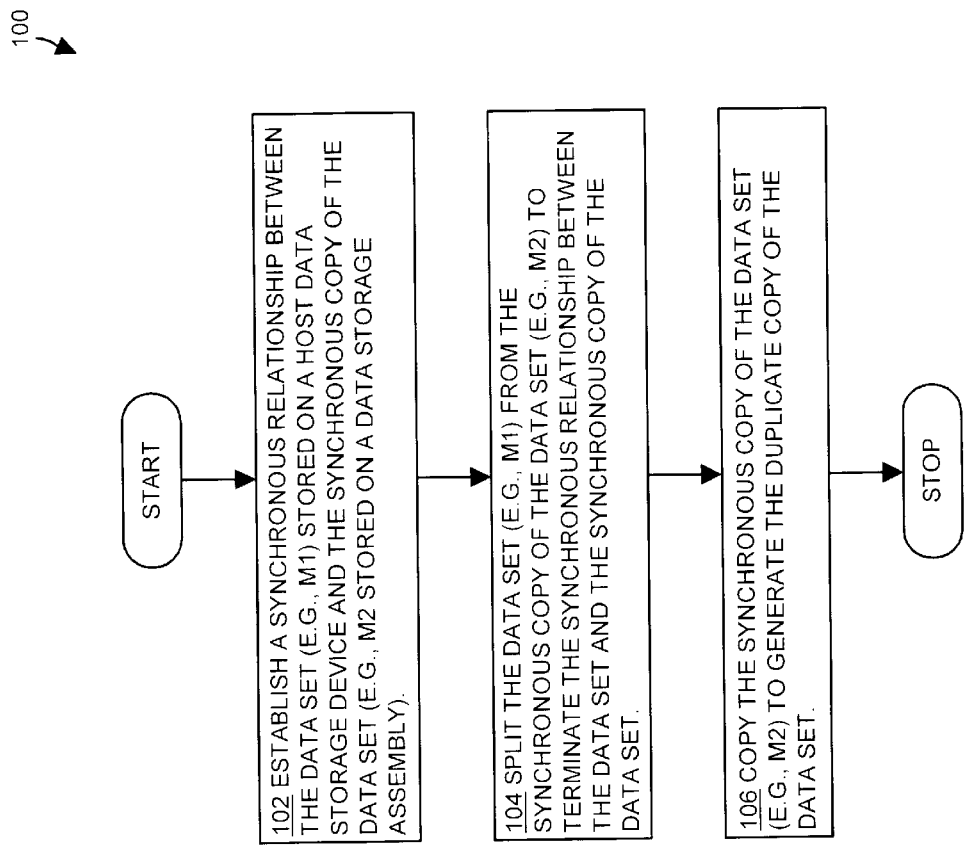
FIG. 2 shows a flow diagram of a procedure for generating a duplicate copy on a data storage assembly of a data set stored on a host computer performed by the host computer illustrated in FIG. 1.

FIG. 2 shows a flow diagram of a procedure 100 for generating a duplicate copy D1 on a data storage assembly 22 of the data set M1 stored on a host computer 24 performed by the host computer 24 illustrated in FIG. 1. In step 102, the host computer 24 establishes a synchronous relationship 28 between the data set M1 stored on the host data storage device 36A and the synchronous copy of the data set M2 stored on the data storage device 36B of the data storage assembly 22. To establish the synchronous relationship 28, the data manager 56 (i.e., the processor 46 performing according to the instructions of the data manager application 54) first makes a copy of the data set M1. While the data manager 56 is making the copy, the data set M1 remains online for any ongoing data changes, such as those made by an application performing on the processor 46 of the host computer 24 (e.g., airline reservations application), and the data manager 56 copies the data set M1 concurrently with the ongoing data changes. The data manger 56 sends the copied data from the data set M1 through the input/output controller 50 of the host computer over the communication connection 26 to the data storage assembly 22. In another embodiment, before copying the data set M1, the data manager 56 quiesces the data set M1 by ceasing to make any ongoing data changes and stores any such changes during the period of quiescence in memory 48 (e.g., in a log, queue, or cache) to be applied to the data set M1 after copying.

The front-end circuitry 38 of the data management circuitry 32 of the data storage assembly 22 receives the data originating from the data set M1 over the communication connection 26. The front-end circuitry 38 stores the data from data set M1 in the cache 40. The back-end circuitry 42 retrieves the data from the data set M1 and copies it to the synchronous (i.e., mirror) copy of the data set M2 stored on the data storage device 36B of the data storage assembly 22. For example, the data set M1 can be a logical volume of data stored on one disk of the data storage device 36A, and the back-end circuitry stores the synchronous copy M2 as a logical volume stored on several disks in the data storage device 36B, because the disk that the data set M1 is stored on in the data storage device 36A has a larger data capacity than the disks in the data storage device 36B.

After copying the data from the data set M1, the data manager 56 of the host computer 24 makes any changes to the data set M1 based on any data changes stored in memory 48 (e.g., in a log or queue) while copying the data set M1 to the synchronous copy of the data set M2. The data manager 56 also establishes the synchronous relationship 28 between the data set M1 and the synchronous copy M2, meaning that the data manager 56 transmits any changes made to the data set M1 to the data storage assembly 22 to update the synchronous copy M2 so that the data in the synchronous copy M2 is updated to the same state as the data in the data set M1. For example, if the data manager 56 receives a change to the data set M1, such as a write data command from another application (e.g., airline reservation application), then the data manager 56 sends the write data command to the input/output controller 50. The input/output controller 50 then packages the write data command in a data change signal 30 for transmission over the communication connection 26 (e.g., as one or more SCSI commands directed to the data storage assembly 22). The data management circuitry 32 of the data storage assembly 22 receives the data change signal 30, recovers the write data command from the data change signal 30, caches the data and write command in the cache 40, and writes the data to the synchronous copy of the data set M2 on the data storage device 36B. Thus, the host computer 24 maintains the synchronous copy M2 as a current copy of the data set M1. If the data set M1 becomes unavailable (e.g., the data storage device 36A has a failure, such as a disk crash) then the host computer 24 can use the synchronous copy M2 as the master version of the data set. If the data set M1 later becomes available, then the data set M1 can be restored from the synchronous copy (see FIGS. 5A and 5B) and redesignated as the master version.

In step 104, the data manager 56 of the host computer 24 performs the split operation that splits the data set M1 from the synchronous copy of the data set M2 to terminate the synchronous relationship 28 between the data set M1 and the synchronous copy M2. The data manager 56 invokes a split operation (e.g., in anticipation of performing a copy of the data set M1 or of the synchronous copy M2) by ceasing to provide data change signals 30 containing data changes made to the data set M1 to the data storage assembly 22 (i.e., ends the synchronous relationship 28). The data manager 56 stores any changes to the data set M1 in memory 48 (e.g., in a queue, log, or cache), while the data set M1 is split from the synchronous copy M2. For example, the data manager 56 stores any changes made to the data set M1 in a track table 58 that the data manger 56 maintains in the memory 48 of the host computer 24, as described in more detail for FIGS. 3A through 5A. Thus, while in a split state, the data manager 56 records any changes to the data set M1 in the track table 58 so that the synchronous copy M2 can be updated at a future time after the split ends.

In step 106, the data manger 56 directs the data management circuitry 32 of the data storage assembly 22 to copy the synchronous copy of the data set M2 in order to generate the duplicate copy D1 of the data set. The data management circuitry 32 first locates a data storage device (e.g., 36C) with storage space available to receive the data forming the duplicate copy D1. The data management circuitry 32 then allocates the storage space (e.g., allocates a range of disk addresses on data storage device 36C) to receive the duplicate copy D1. The data management circuitry 32 then copies the data from the synchronous copy M2 on data storage device 36B to the storage space allocated for the duplicate copy D1 on data storage device 36C. Then, the duplicate copy D1 serves as a copy of the original data set M1, and is available for various purposes without interfering with the functioning and/or mirroring of the data set M1. These purposes include serving as a further backup or restoration copy in addition to the synchronous copy M2, being available for testing, and being available for analysis of the data set performed by a computer other than the host computer 24.

After the data management circuitry 32 creates the duplicate copy D1, as described above, the data manager 56 of the host computer 24 can re-establish the synchronous relationship 28 between the data set M1 and the synchronous copy M2. The data manager 56 uses the track table 58 to determine what changes have occurred to the data set M1 while the split was in effect, and then sends data change signals 30 to the data storage assembly 22 that contain the changes for the tracks indicated by the track table 58. The data management circuitry 32 then makes the changes indicates by the data change signals 30 to the synchronous copy M2 so as to bring the data in the synchronous copy M2 into the same state as the data in the data set M1. Then, if there is a further change to the data set M1, the data manager 56 transmits a data change signal 30 containing the change to the data storage assembly 22, which then updates the synchronous copy M2 with the change indicated by the data change signal 30. Thus, data manager 56 re-establishes the synchronous copy M2 as a mirror copy of the data set M1, and the synchronous copy M2 becomes available to use in restoring the data set M1 if the data set M1 becomes unavailable or is corrupted. In addition, the if M1 is unavailable, then the host computer 24 can use the synchronous copy M2 as the original or master version of the data with minimal or no interruption in the data processing functions of the host computer 24 (e.g., functioning of an airline reservation application performing on the processor 46 of the host computer 24).

Figure 3A:
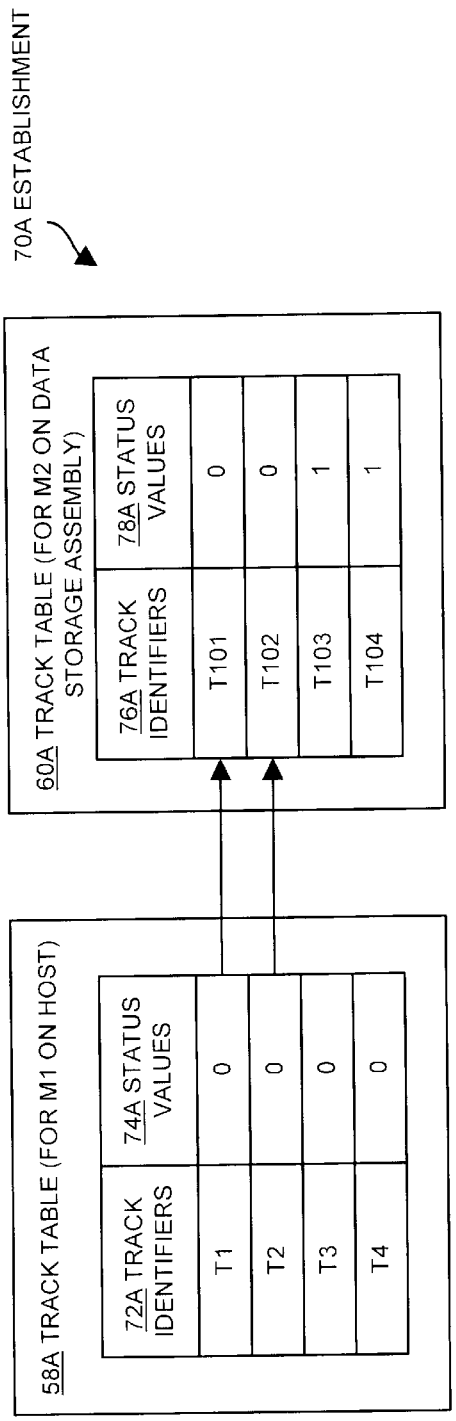
FIG. 3A shows a block diagram of examples of track tables suitable for use in establishing synchronization with a synchronous copy of the data set in accordance with the invention.
Figure 3B:
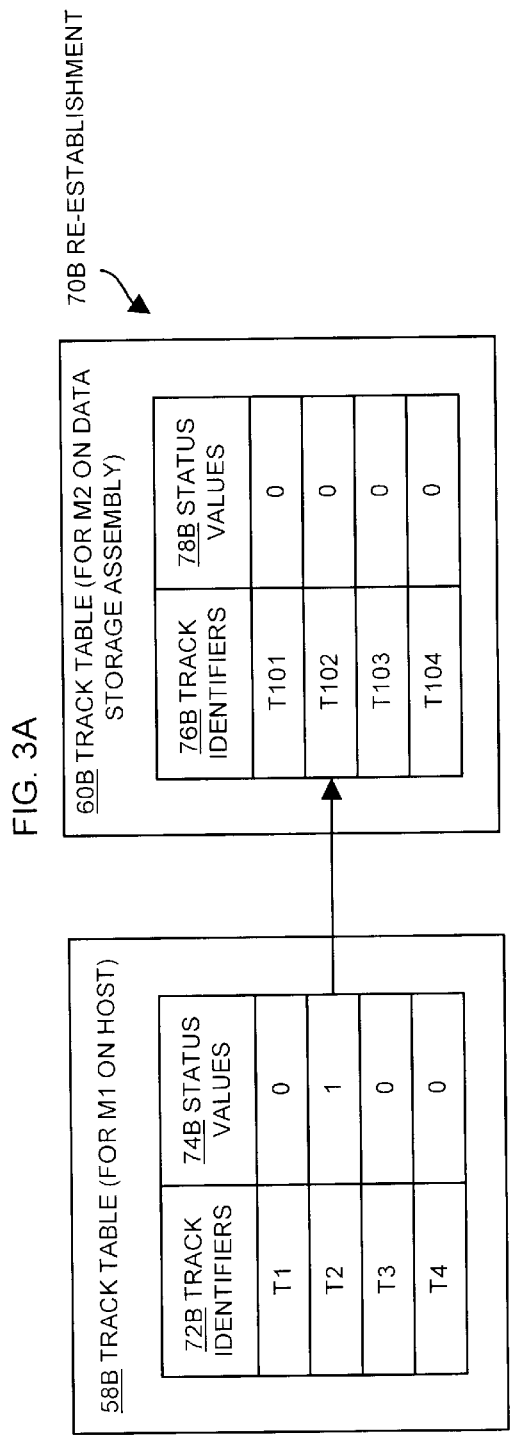
FIG. 3B shows a block diagram of examples of track tables suitable for use in re-establishing synchronization with a synchronous copy of the data set in accordance with the invention.
Figure 5A:
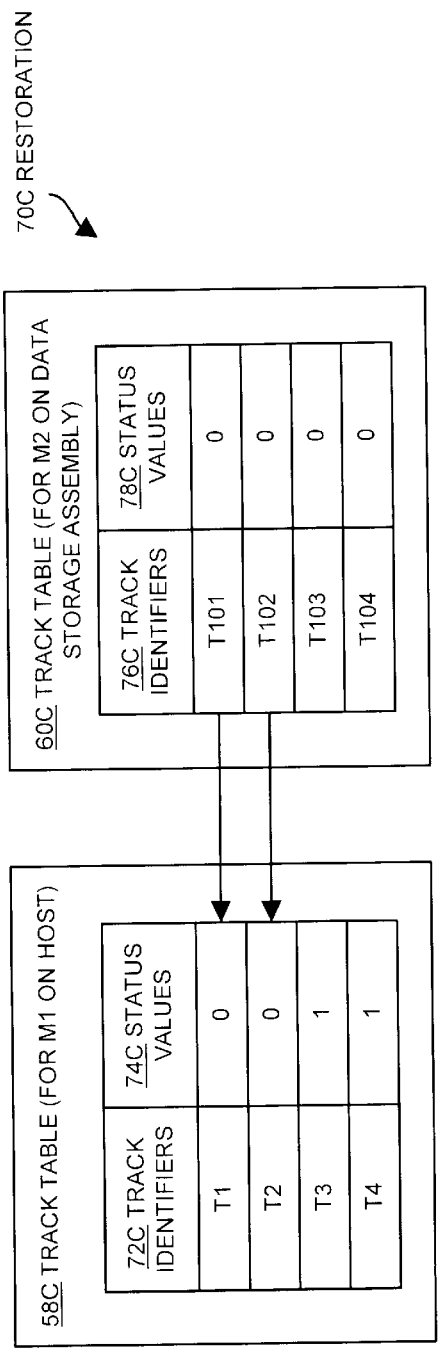
FIG. 5A shows a block diagram of examples of track tables suitable for use in a restoration of the data set in accordance with the invention.
Figure 5B:
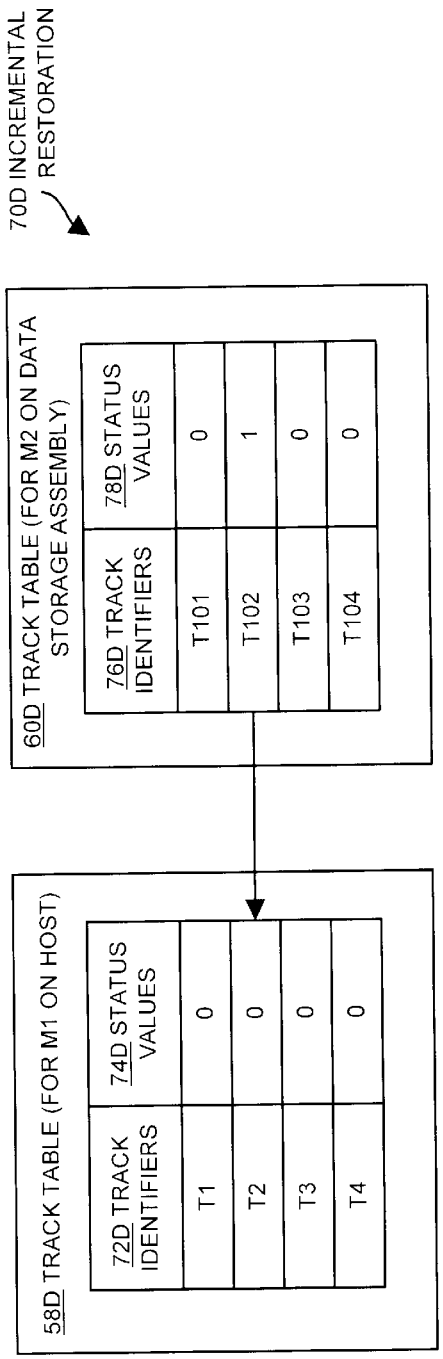
FIG. 5B shows a block diagram of examples of track tables suitable for use in an incremental restoration of the data set in accordance with the invention.

FIG. 3A shows a block diagram of examples of a pair of track tables 58A and 60A suitable for use in a sample establishment 70A that establishes synchronization with a synchronous copy of the data set M2 in accordance with the invention. The track table 58A is one example of the track table 58 of FIG. 1 for a data set M1 stored on a data storage device 36A for a host computer 24. The track table 60A is one example of the track table 60 of FIG. 1 for a synchronous copy of the data set M2 stored on a data storage device 36B of the data storage assembly 22. FIG. 3A illustrates a sample state of the track tables 58A and 60A during an example of the process of establishment of the synchronous copy of the data set M2. The establishment 70A is one example of operations invoked by the data manager 56 of the host computer 24 and represented in FIGS. 3A, 3B, 5A, and 5B, which also include a pair of sample track tables 58B and 60B for a sample re-establishment 70B as shown in FIG. 3B, a pair of sample track tables 58C and 60C for a sample restoration 70C as shown in FIG. 5A, and a pair of sample track tables 58D and 60D for sample incremental restoration 70D as shown in FIG. 5B.

The track tables 58 (e.g., 58A, 58B, 58C, and 58D) for a host computer 24 shown in FIGS. 3A, 3B, 5A, and 5B each have track identifiers 72 (e.g., 72A, 72B, 72C, and 72D) that identify tracks T1, T2, T3, and T4 on the data storage device 36A represented in each host track table 58 (e.g., 58A, 58B, 58C, and 58D) and status values 74 (e.g., 74A, 74B, 74C, and 74D) for the respective tracks. The track tables 60 (e.g., 60A, 60B, 60C, and 60D) for a data storage assembly 22 shown in FIGS. 3A, 3B, 5A, and 5B each have track identifiers 76 (e.g., 76A, 76B, 76C, and 76D) that identify tracks T101, T102, T103, and T104 on the data storage device 36B for each data storage assembly track table 60 (e.g., 60A, 60B, 60C, and 60D) and status values 78 (e.g., 78A, 78B, 78C, and 78D) for each respective track. Generally, the status values 74 and 78 indicate, by a value of 1, a track that has an invalid or changed status, and a value of 0 indicates a valid or unchanged status, as will be discussed for each figure, FIGS. 3A, 3B, 5A, and 5B.

For each pair of tables (e.g., 58A and 60A), the track identifiers (e.g., 72A) identify tracks (e.g., T1) on a data storage device (e.g., 36A on a host computer 24) that contains data for the data set M1 that correspond to track identifiers (e.g., 76A) that identify respective tracks (e.g., T101) on a data storage device (e.g., 36B on a data storage assembly 22) that contain data for the synchronous copy of the data set M2. That is, track T1 corresponds to track T101, track T2 corresponds to track 102, track T3 corresponds to track T103, and track T4 corresponds to track T104. If the data set M1 and the synchronous copy M2 are synchronized (i.e., have the same data), then track T1 has the same data as track T101, track T2 has the same data as track T102, track T3 has the same data as track T103, and track T4 has the same data as track T104. The track tables 58A, 58B, 58C, 58D, 60A, 60B, 60C, and 60D show four tracks for each table as an example only. For example, track tables 58A and 60A can have a larger or smaller number of track identifiers 72A, 76A than the four track identifiers 72A in table 58A and four track identifiers 76A in 60A.

Referring now to FIG. 3A, during an establishment the data manager 56 sets all of the status values 74A in the host track table 58A to a value of 0, which indicates that all the data in the data set M1 stored on the data storage device 36A are considered valid. The data manager 56 requests that the data management circuitry 32 allocate space on a data storage device (e.g., 36A) to receive the synchronous copy M2 of data from the data set M1. Before copying any data from the data set M1, the data manager 56 sets (or directs the data storage assembly 22 to set) all of the status values 78A in the data storage assembly track table 60A to a value of 1, which indicates that any data stored on the data storage device 36B in the tracks allocated for the synchronous copy M2 are considered invalid, because no copying has occurred yet.

As shown in FIG. 3A, the data manager 56 is part way through the process of copying the data from data set M1 to the synchronous copy of the data set M2. The data manager 56 has copied tracks T1 and T2 on the data storage device 36A of the host computer 24 for the data set M1 to the tracks T101 and T102 on the data storage device 36B of the data storage assembly 22 for the synchronous copy M2. Thus, the status values 78A for tracks T101 and T102 have a value of 0, indicating valid data. The status values 78A for tracks T103 and T104 have a value of 1, indicating invalid data, because the data manager 56 has not yet copied any data from tracks T3 and T4 to tracks T103 and T104. The data manager 56 can continue to copy the data from other tracks (e.g., T3 and T4) on the data storage device 36A for the data set M1 to the respective tracks (e.g., T103 and T104) on the data storage device 36B for the synchronous copy M2. When the data manager 56 has copied all of the tracks for the data set M1 to the respective tracks for synchronous copy M2, then the copy is complete. The use of track tables 58A and 60A means that the copying of data set M1 can be interrupted, and the data manager 56 can readily determine, by examining the track table 60A, at which track to resume the copying of data set M1 to the synchronous copy M2.

FIG. 3B shows a block diagram of examples of track tables 58B and 60B suitable for use in a sample re-establishment 70B that re-establishes synchronization with a synchronous copy of the data set M2 in accordance with the invention.

The data storage assembly track table 60B includes track identifiers 76B with corresponding status values 78B for a synchronous copy of a data set M2. All of the tracks, T101, T102, T103, and T104 in the track table 60B have a status value of 0, indicating that the data in each track is valid. For example, if the data manager 56 has just completed an establishment, as described above for FIG. 3A, then the status values 78B of 0 in track table 60B indicate that all tracks from the data set M1 were copied successfully to the tracks for a synchronous copy M2 stored in a data storage device (e.g., 36B) represented in the track table 60B for the data storage assembly 22.

The host track table 58B includes track identifiers 72B with corresponding status values 74B for a data set M1, indicating that track T1 has a status value of 0, track T2 has a status value of 1, track T3 has a status value of 0, and track T4 has a status value of 0. The status values of 0 indicate that there has been no change in the data in the corresponding tracks, T1, T3, and T4, for data set M1. The status value of 1 indicates that there has been a change in the data in track T2 that has not yet been transmitted to the corresponding tract T102 for the data storage assembly 22. For example, if the data manager 56 has recently performed an establishment, then the status value of 1 for track T2 in track table 58B indicates that the data manger 56 has changed the data in track T2 after the establishment. In such an example, the data manager 56 may have performed a split operation which terminated the synchronous relationship 28 between the data set M1 and the synchronous copy of the data set M2. While the split was in effect, in this example, then the data manager 56 made a change to the data in track T2 in track table 58B, which is reflected in the value of 1 for track T2 in the host track table 58B, but this change has not yet been made to the corresponding tract T102.

To perform the re-establishment, the data manager 56 must copy the data for any tracks that have changed in the data set M1 to the corresponding tracks for the synchronous copy M2. For example, the data manager 56 must copy track T2 from the data set M1 to the corresponding track T102 for the synchronous copy M2. When the data manager 56 completes this copy (e.g., by sending a copy of the data in track T2 in a data change signal 30 to the data storage assembly 22), then the data manger 56 can change the status value 72B for track T2 from a value of 1 (i.e., changed data) to a value of 0 (i.e., no change in data). The flow chart shown in the next figure, FIG. 4, provides more detail on a re-establishment for changes in data that involve more than one track.

Figure 4:
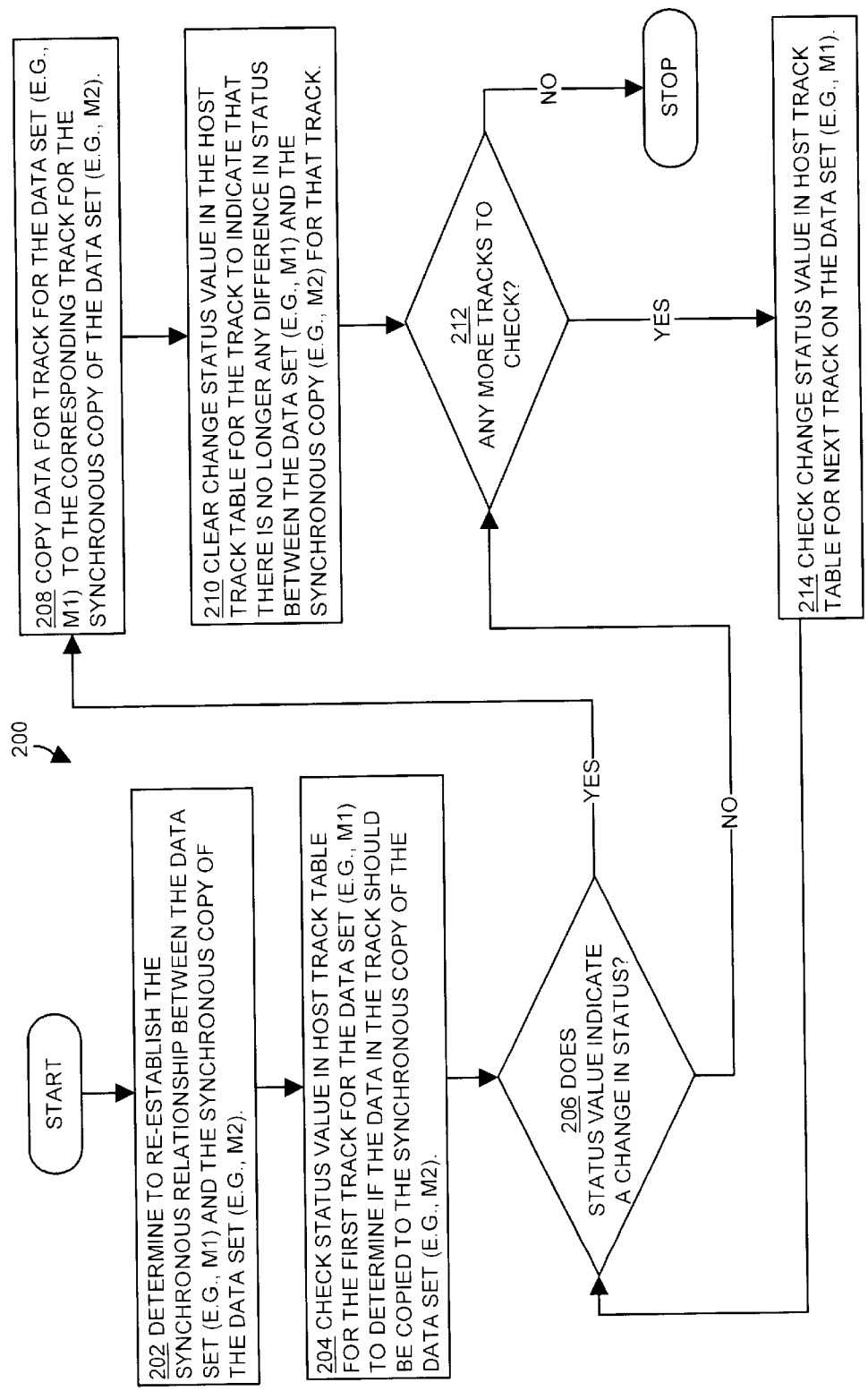
FIG. 4 shows a flow diagram of a procedure for re-establishing synchronization performed in accordance with the invention.

FIG. 4 shows a flow diagram of a procedure 200 for re-establishing synchronization performed in accordance with the invention. The examples discussed for this procedure 200 below are the sample host track table 58B and the sample data storage assembly track table 60B shown in FIG. 3B.

In step 202, the data manager 56 of the host computer 24 determines to re-establish the synchronous relationship 28 between the data set M1 and the synchronous copy of the data set M2. For example, after a split operation, as discussed for FIG. 2, the host computer 24 receives a signal from the data storage assembly that the duplicate copy D1 of the synchronous copy M2 has been made and stored on the data storage device 36C. In this example, the host computer 24 then decides to re-establish the synchronous relationship 28 between the data set M1 and the synchronous copy M2 as a result of the signal in order to maintain the synchronous copy M2 as an up-to-date or mirror copy of the data set M1.

In step 204, the data manager 56 check the status value 74 in the host track table 58 for the first track for the data set M1 to determine if the data in the track should be copied to the synchronous copy of the data set M2. For example, the data manager 56 checks the status value 74B in the host track table 58B (see FIG. 3B) for the first track T1 in the host track table 58B.

In step 206, the data manager 56 evaluates whether the status value 74 indicates a change in status for the track. If the status value 74 indicates a change in status, then the data manager proceeds to step 208, as described below. If the status value 74 indicates no change in status, then the data manager 56 proceeds to step 212, as described below. For the example shown in FIG. 3B, the data manager 56 evaluates the value, which is 0, for the first track T1, indicated by the track identifiers 72B in the host track table 58B, and determines from the value of 0 that there has been no change in the data in track T1. In this example, the data manager 56 then proceeds to step 212.

In step 212, the data manager 56 determines if there are more tracks to check in the host track table 58. If there are no other tracks to check, then the data manager 56 stops the procedure 200 and considers the re-establishment to be complete. If there are other tracks to check, the data manager 56 proceeds to step 214. For the example shown in FIG. 3B, the data manager 56 determines that there are other tracks, T2, T3, and T4, indicated by the track identifiers 72B to be checked, and proceeds to step 214.

In step 214, the data manager 56 checks the status value 74 in the host track table 58 for the next track for the data set M1. For the example shown in FIG. 3B, the data manager 56 checks the status value 74B for the next track T2 indicated by the track identifiers 72B in the host track table 58B, and determines that the status value 74B for track T2 has a value of 1. The data manger 56 then proceeds to step 206.

In step 206, the data manager 56 checks the status value 74 to determine if the value 74 indicates a change in status. If a change in status is indicated, then the data manager 56 proceeds to step 208. If a change in status is not indicated, then the data manager 56 proceeds to step 212. For the example shown in FIG. 3B, the data manager 56 determines that the status value of 1 for track T2 indicates a change in the data in track T2 for data set M1 and proceeds to step 208.

In step 208, the data manager 56 copies the data for the track to the corresponding track in the synchronous copy of the data set M2. For example, in reference to FIG. 3B, the data manager 56 copies the data for track T1 for the data set M2 to the corresponding track T102 for the synchronous copy M2 as indicated in the data storage assembly track table 60B that represents tracks for the synchronous copy of the data set M2.

In step 210, the data manager 56 clears the change status value 74 in the host track table 58 for the copied track to indicate that there is no longer any difference for that track in status between the data set M1 and the synchronous copy of the data set M2. For the example shown in FIG. 3B, the data manager 56 changes the status value 74B for track T2 to a value of 0 to indicate that there is no longer any difference in the data between track T2 and the corresponding track T102.

In step 212, the data manager 56 determines if there are any more tracks to check in the host track table 58B. If there are no more tracks to check, then the data manager 56 considers the re-establishment complete, as described earlier. If there are more tracks to check, then the data manager 56 proceeds to step 214, as described previously.

Thus the data manager 56 can determine from its own track table 58B for data set M1 what tracks on a synchronous copy of the data set M2 require updating and is not required to rely on a track table for the data set M1 maintained on the data storage assembly 22. Thus, if there is a failure of the data storage assembly 22 or the communication connection 26 to the data storage assembly 22, then the data manager 56 can still maintain its own host track table 58 that remains available on the host computer 24.

FIG. 5A shows a block diagram of examples of track tables 58C and 60C suitable for use in a sample restoration 70C of the data set M1 that restores all of the data in the data set M1 from a synchronous copy of the data set M2 in accordance with the invention. A restoration may occur, for example, due to a crash or failure of the data storage device 36A that stores M1, with the results that all data for M1 is lost and the entire data set M1 must be restored. In this example, the synchronous copy of the data set M2 serves as a backup copy that can be used to restore the data set M1 to the same state as the synchronous copy M2. In this example, all data on data set M1 is considered invalid, such as when the physical data storage device 36A for data set M1 has failed and a new data storage device 36A is installed for the host computer 24.

During a restoration, the data manager 56 sets all of the status values 78 in the data storage assembly track table 60 to a value of 0, which indicates that all the data in the data set M2 stored on the data storage device 36B is considered valid. For the example shown in FIG. 5A, before copying any data from the data set M2, the data manager 56 sets all of the status values 74C in the host track table 58C to a value of 1, which indicates that any data stored on the data storage device 36A on the host computer 24 in the tracks M1 are considered invalid, because no copying has occurred yet.

As indicated in FIG. 5A, the data manager 56 has copied tracks T101 and T102 on the data storage device 36C of the data storage assembly 22 for the synchronous copy M2 to the tracks T1 and T2 on the data storage device 36A of the host computer 24 for the restored data set M1. Thus, the status values 74C for tracks T1 and T2 have a value of 0, indicating valid data. The status values 74C for tracks T3 and T4 have a value of 1, indicating invalid data, because the data manager 56 has not yet copied any data from tracks T103 and T104 to tracks T3 and T4. The data manager 56 can continue to copy the data from any other tracks (e.g., T3 and T4) not yet copied on the data storage device 36B for the synchronous copy M2 to the respective tracks (e.g., T3 and T4) on the data storage device 36A for the restored data set M1. When the data manager 56 has copied all of the tracks for the synchronous copy M2 to the respective tracks for the restored data set M1, then the restoration is complete. The use of track tables 58C and 60C means that the copying of the synchronous copy M2 can be interrupted, and the data manager 56 can readily determine, by examining the host track table 58C, at which track to resume the copying of the synchronous copy M2.

FIG. 5B shows a block diagram of examples of track tables 58D and 60D suitable for use in a sample incremental restoration 70D of the data set M1 that restores part of the data in the data set M1 from a synchronous copy of the data set M2 in accordance with the invention. An incremental restoration may occur if the data set M1 becomes unavailable for a period of time (e.g., due to a problem with the data storage device 36A), and the data manager 56 uses the synchronous copy of the data set M2 as the master version of the data set. The data manager 56 records any changes to data on the synchronous copy M2 on the data storage assembly track table 60D (e.g., by setting the status values 78D for any changed tracks to a value of 1).

The data storage assembly track table 60D includes track identifiers 76D with corresponding status values 78D for the synchronous copy of a data set M2, indicating that track T101 has a status value of 0, track T102 has a status value of 1, track T103 has a status value of 0, and track T104 has a status value of 0. The status values 78D of 0 indicate that there has been no change in the data in the corresponding tracks, T101, T103, and T104, for the synchronous copy M2. The status value 78D for track T102 has a value of 1, which indicates that the data in track T102 has changed. For example, while the data set M1 was unavailable and the data manager 56 was using the synchronous copy M2 as the master version of the data set, the data manager 56 made a change to data in track T102 on the synchronous copy M2. After making the change, the data manager 56 records the change in the data storage assembly track table 60D by changing the status value 78D for track T102 from a value of 0 to a value of 1, indicating that the data manager 56 has made a change to track T102 that has not yet been made to the corresponding track T2.

Before the data manager 56 performs an incremental restoration of the data set M1, all of the tracks, T1, T2, T3, and T4 in the track table 58D have a status value of 0, indicating no change in the data for data set M1 while the data set M1 was unavailable. For example, the data set M1 was unavailable (e.g., due to a problem with the data storage device 36A) while the synchronous copy M2 served as the master version and thus the data manager 56 made no changes to the tracks T1, T2, T3, and T4.

To perform the incremental restoration, the data manager 56 must copy the data for track T102 from the synchronous M2 to the corresponding track T2 for the synchronous copy M2. When the data manager 56 completes this copy (e.g., by sending a copy of the data in track T102 to the data storage assembly 22), then the data manger 56 can change the status value 78D for track T102 from a value of 1 (i.e., changed data) to a value of 0 (i.e., no change in data). The data manager 56 checks all of the tracks in the data storage assembly track table 60D to determine which tracks to copy from the synchronous copy M2 to the data set M1, in a manner generally similar to the re-establishment procedure 200 described in FIG. 4.

As described previously, the invention is directed to techniques for generating a duplicate copy of a data set. In summary, the data manager 56 of a host computer 24 maintains a track table 58 for a data set M1 stored on a data storage device 36A associated with the host computer 24. A data storage device 36B on the data storage assembly 22 stores a track table 60 for a synchronous copy of the data set M2. When tracking changes made to the synchronous copy M2 (e.g., when the synchronous copy M2 serves as the master version of the data set), the data storage assembly 22 maintains the track table 60. During an establishment or incremental restore operation, the data manager 56 of the host computer 24 maintains the track table 60 (e.g., updates the status values 78 after synchronizing the tracks of the synchronous copy M2 with the corresponding tracks of the data set M1). The data manager 56 can establish the synchronous copy M2 by copying from the data set M1, and establish a synchronous relationship 28 between the synchronous copy M2 and the data set M1 to maintain the data in the synchronous copy M2 in the same state as the data in the data set M1. The data manager 56 can perform a split operation to terminate the synchronous relationship 28 and direct that a duplicate copy D1 of the synchronous copy M2 be made. After the duplicate copy D1 has been made, the data manager 56 can re-establish the synchronous relationship 28 between the synchronous copy M2 and the data set M1. Thus the data manager 56 can control, from the host computer 24, the establishment, split, and duplication operations. The data manager 56 can also compare changes to the data set M1 and synchronous copy M2 by referring to track tables 58 and 60 maintained on the host computer 24 and the data storage assembly 22 respectively.

While this invention has been particularly shown and described with references to preferred embodiments thereof, it will be understood by those skilled in the art that various changes in form and details may be made therein without departing from the spirit and scope of the invention as defined by the appended claims.

In one example, the data manager application 54 can be implemented in various ways. For example, the instructions of the data manager application 54 can be implemented in hardware, such as analog circuitry or as digital circuitry based on an IC (integrated circuit) approach, and the circuitry when in operation forms the data manager 56. The data manager application 54 can also be implemented as a combination of software instructions and hardware circuitry.

In another example, the communication connection 26 can be any type of network suitable for use with computers and electronic devices. The communication connection 26 can be a local area network (LAN) or storage area network (SAN), based on fiber channel or other connections among the devices in the LAN or SAN. The network communication connection 26 can be based on any suitable protocol, such as TCP (Transmission Control Protocol) and/or IP (Internet Protocol), Ethernet protocols, or any suitable variation, such as SCSI protocols adapted to be transmitted over a packet-based network (e.g., SCSI over IP).

Furthermore, each data set M1, M2, or D1 can be stored on one or more data storage devices 36. In addition, each data storage device 36 can be an array of disk drives, and each data set M1, M2, or D1 can be stored on one or more disk drives (or portions of disk drives) on one or more data storage devices 36. In one embodiment, one or more of the data storage devices 36 is a RAID (Redundant Array of Independent Disks).

In another example, a data set M1 can be copied to a similar type and size of disk (e.g., having the same number of tracks), or to a dissimilar type and size of disk. For example, the data set M1 can represent one logical volume that can be copied to a synchronous copy M2 on the data storage assembly 22 that is allocated to storage space (e.g., disk addresses) on disks in a data storage device 36B or to disks in multiple data storage devices 36. Generally, there is no requirement by the invention that each data set M1, synchronous copy M2, and/or duplicate copy D1 be allocated to one data storage device 36.

Furthermore, the host data storage device 36A can be an integral part of host computer 24 or closely coupled to the host computer 24 (e.g., connected by SCSI channel or other suitable connection).

In addition, a track table (e.g., 58 or 60) can be for any type of groupings of data, such as track, sectors, extents, ranges of disk addresses, blocks, files, or other groupings of data. Groupings of data can also be mapped. For example, if tracks have different track sizes, then two tracks on data set M1 can be mapped to one track on the synchronous copy M2 in the track tables 58 and 60. In addition, the status values 74 and 78 can have values other than the binary values shown in FIGS. 3A, 3B, 5A, and 5B. The status values can be based on decimal values, text strings, or other values that can indicate different types of status for the tracks.

In an additional example, the propagated signal used by the computer program propagated signal product 182 can be an analog carrier wave or a digital signal carried on the propagated medium. For example, the propagated signal can be a digitized signal propagated over the Internet or other network. Furthermore, the propagated signal can be a signal that is transmitted over the propagation medium over a period of time, such as the instructions for a software application sent in packets over a network over a period of seconds, minutes, or longer. In addition, the computer readable medium of the computer program product 180 can be based on a propagation medium that the computer can receive and read, such as by receiving the propagation medium and identifying a propagated signal embodied in the propagation medium, as described previously for the computer program propagated signal product 182.

What is claimed is:

1. In a host computer having a storage device that stores a data set, a method for generating a duplicate copy of the data set on a data storage assembly in communication with the host computer, comprising the steps of:

establishing a synchronous relationship between the data set and a synchronous copy of the data set, the synchronous copy stored on the data storage assembly;

splitting the data set from the synchronous copy of the data set to terminate the synchronous relationship between the data set and the synchronous copy of the data set; and copying the synchronous copy of the data set to generate the duplicate copy of the data set;

wherein splitting includes maintaining a record of changed memory locations which change after termination of the synchronous relationship between the data set and the synchronous copy of the data set.

2. The method of claim 1, further comprising the step of re-establishing the synchronous relationship between the data set and the synchronous copy of the data set, after the step of copying the synchronous copy of the data set.

3. The method of claim 1 wherein the record of changed memory locations is a track table indicating modified disk tracks which change after termination of the synchronous relationship and wherein the method further comprises re-establishing the synchronous relationship between the data set and the synchronous copy of the data set, based on the track table, after copying the synchronous copy of the data set.

4. In a host computer having a storage device that stores a data set, a method for generating a duplicate copy of the data set on a data storage assembly in communication with the host computer, comprising the steps of:

establishing a synchronous relationship between the data set and a synchronous copy of the data set, the synchronous copy stored on the data storage assembly;

splitting the data set from the synchronous copy of the data set to terminate the synchronous relationship between the data set and the synchronous copy of the data set; and copying the synchronous copy of the data set to generate the duplicate copy of the data set, wherein the step of establishing the synchronous relationship comprises setting up a track table on the data storage assembly that provides status entries for tracks for the synchronous copy of the data set.

5. The method of claim 4, wherein the step of establishing the synchronous relationship comprises setting each status entry in the track table to an invalid status, and, while copying data from the data set to each respective track of the synchronous copy of the data set, setting each status entry for each respective track in the track table to a valid status.

6. The method of claim 4, further comprising the step, in response to an unavailability of the data set, of accessing a specific track in the synchronous copy of the data set to change data in the specific track and setting a respective status entry for the specific track in the track table to indicate a change status for the specific track.

7. In a host computer having a storage device that stores a data set, a method for generating a duplicate copy of the data set on a data storage assembly in communication with the host computer, comprising the steps of:
  establishing a synchronous relationship between the data set and a synchronous copy of the data set, the synchronous copy stored on the data storage assembly;
  splitting the data set from the synchronous copy of the data set to terminate the synchronous relationship between the data set and the synchronous copy of the data set; and
  copying the synchronous copy of the data set to generate the duplicate copy of the data set, wherein the step of establishing the synchronous relationship comprises setting up a host track table on the host computer that provides status entries for tracks for the data set.

8. The method of claim 7, further comprising the step of copying changed tracks identified by the status entries in the host track table from the data set to the synchronous copy of the data set to re-establish the synchronous relationship between the data set and the synchronous copy of the data set.

9. In a host computer having a storage device that stores a data set, a method for generating a duplicate copy of the data set on a data storage assembly in communication with the host computer, comprising the steps of:
  establishing a synchronous relationship between the data set and a synchronous copy of the data set, the synchronous copy stored on the data storage assembly;
  splitting the data set from the synchronous copy of the data set to terminate the synchronous relationship between the data set and the synchronous copy of the data set; and
  copying the synchronous copy of the data set to generate the duplicate copy of the data set, wherein the step of splitting the data set from the synchronous copy of the data set comprises the steps of updating the data set based on pending changes to the data set and quiescing the data set.

10. The method of claim 9, wherein the step of updating the data set comprises the step of applying the pending changes maintained in an application queue to the data set.

11. A host computer for generating a duplicate copy of a data set on a data storage assembly in communication with the host computer, the host computer comprising:
  a memory that stores a data manager application;
  a storage device that stores a data set;
  an input/output controller in communication with the memory and the storage device; and
  a processor in communication with the memory, the storage device, and the input/output controller, wherein the processor, when operating in accordance with the data manager application, forms a data manager, which:
    establishes a synchronous relationship between the data set and a synchronous copy of the data set, the synchronous copy stored on the data storage assembly;
    splits the data set from the synchronous copy of the data set to terminate the synchronous relationship between the data set and the synchronous copy of the data set; and
    copies the synchronous copy of the data set to generate the duplicate copy of the data set;
  wherein the data manager is operable to split the data set by maintaining a record of changed memory locations which chance after termination of the synchronous relationship between the data set and the synchronous copy of the data set.

12. The host computer of claim 11, wherein the data manager application further configures the processor to re-establish the synchronous relationship between the data set and the synchronous copy of the data set, after copying the synchronous copy of the data set.

13. The host computer of claim 11 wherein the record of changed memory locations is a track table indicating modified disk tracks which change after termination of the synchronous relationship and wherein the method further comprises re-establishing the synchronous relationship between the data set and the synchronous copy of the data set, based on the track table, after copying the synchronous copy of the data set.

14. A host computer for generating a duplicate copy of a data set on a data storage assembly in communication with the host computer, the host computer comprising:
  a memory that stores a data manager application;
  a storage device that stores a data set;
  an input/output controller in communication with the memory and the storage device; and
  a processor in communication with the memory, the storage device, and the input/output controller, wherein the processor, when operating in accordance with the data manager application, forms a data manager, which:
    establishes a synchronous relationship between the data set and a synchronous copy of the data set, the synchronous copy stored on the data storage assembly;
    splits the data set from the synchronous copy of the data set to terminate the synchronous relationship between the data set and the synchronous copy of the data set; and
    copies the synchronous copy of the data set to generate the duplicate copy of the data set,
  wherein the data manager application further configures the processor to set up a track table on the data storage assembly that provides status entries for tracks for the synchronous copy of the data set.

15. The host computer of claim 14, wherein the data manager application further configures the processor to set each status entry in the track table to an invalid status, and, while copying data from the data set to each respective track of the synchronous copy of the data set, to set each status entry for each respective track in the track table to a valid status.

16. The host computer of claim 14, wherein the data manager application further configures the processor to access, in response to an unavailability of the data set, a specific track in the synchronous copy of the data set to change data in the specific track and setting a respective status entry for the specific track in the track table to indicate a change status for the specific track.

17. A host computer for generating a duplicate copy of a data set on a data storage assembly in communication with the host computer, the host computer comprising:

a memory that stores a data manager application;

a storage device that stores a data set;

an input/output controller in communication with the memory and the storage device; and a processor in communication with the memory, the storage device, and the input/output controller, wherein the processor, when operating in accordance with the data manager application, forms a data manager, which:

establishes a synchronous relationship between the data set and a synchronous copy of the data set, the synchronous copy stored on the data storage assembly;

splits the data set from the synchronous copy of the data set to terminate the synchronous relationship between the data set and the synchronous copy of the data set; and copies the synchronous copy of the data set to generate the duplicate copy of the data set, wherein the data manager application further configures the processor to set up a host track table on the host computer that provides status entries for tracks for the data set.

18. The host computer of claim 17, wherein the data manager application further configures the processor to copy changed tracks identified by the status entries in the host track table from the data set to the synchronous copy of the data set to re-establish the synchronous relationship between the data set and the synchronous copy of the data set.

19. A host computer for generating a duplicate copy of a data set on a data storage assembly in communication with the host computer, the host computer comprising:

a memory that stores a data manager application;

a storage device that stores a data set;

an input/output controller in communication with the memory and the storage device; and a processor in communication with the memory, the storage device, and the input/output controller, wherein the processor, when operating in accordance with the data manager application, forms a data manager, which:

establishes a synchronous relationship between the data set and a synchronous copy of the data set, the synchronous copy stored on the data storage assembly;

splits the data set from the synchronous copy of the data set to terminate the synchronous relationship between the data set and the synchronous copy of the data set; and copies the synchronous copy of the data set to generate the duplicate copy of the data set, wherein the data manager application further configures the processor to update the data set based on pending changes to the data set and to quiesce the data set.

20. The host computer of claim 19, wherein the data manager application further configures the processor to apply the pending changes maintained in an application queue to the data set.

21. In a host computer having a storage device that stores a data set, a method for generating a duplicate copy of the data set on a data storage assembly in communication with the host computer, comprising the steps of:

establishing a synchronous relationship between the data set and a synchronous copy of the data set, the synchronous copy stored on the data storage assembly;

splitting the data set from the synchronous copy of the data set to terminate the synchronous relationship between the data set and the synchronous copy of the data set;

copying the synchronous copy of the data set to generate the duplicate copy of the data set; and recording ongoing data changes in a memory, the memory operable to recall and apply the ongoing data changes to the data set.

22. The method of claim 21 wherein the memory stores a track table operable to hold the ongoing data changes, the track table corresponding to tracks in the data set, the tracks mapping portions of the data set to corresponding portions of the synchronous data set.

23. A host computer for generating a duplicate copy of a data set on a data storage assembly in communication with the host computer, the host computer comprising:

a memory that stores a data manager application;

a storage device that stores a data set;

an input/output controller in communication with the memory and the storage device; and a processor in communication with the memory, the storage device, and the input/output controller, wherein the processor, when operating in accordance with the data manager application, forms a data manager, which:

establishes a synchronous relationship between the data set and a synchronous copy of the data set, the synchronous copy stored on the data storage assembly;

splits the data set from the synchronous copy of the data set to terminate the synchronous relationship between the data set and the synchronous copy of the data set; and copies the synchronous copy of the data set to generate the duplicate copy of the data set, wherein the data manger is further operable to split the data set by recording ongoing data changes in a memory, the memory operable to recall and apply the ongoing data changes to the data set.

24. The host computer of claim 23 wherein the memory stores a track table operative to hold the ongoing data changes, the track table corresponding to tracks in the data set, the tracks mapping portions of the data set to corresponding portions of the synchronous data set.

* * * * *